(12) United States Patent
Uegane

(10) Patent No.: US 6,406,066 B1
(45) Date of Patent: Jun. 18, 2002

(54) CONNECTING STRUCTURE FOR EXHAUST PIPES

(75) Inventor: Masayuki Uegane, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 54 days.

(21) Appl. No.: 09/709,471

(22) Filed: Nov. 13, 2000

(30) Foreign Application Priority Data

Nov. 12, 1999 (JP) .......................................... 11-322735

(51) Int. Cl.$^7$ ................................................. F16L 39/00
(52) U.S. Cl. ...................... 285/124.1; 285/267; 285/268
(58) Field of Search .......................... 285/124.1, 124.2, 285/121.4, 121.5, 121.6, 121.7, 47, 124.3, FOR 118, 261, 223, 267, 268

(56) References Cited

U.S. PATENT DOCUMENTS

| 635,512 A | * 10/1899 | Savery ..................... 285/121.4 |
| 4,188,784 A | * 2/1980 | Hall ........................ 285/268 X |
| 4,277,092 A | * 7/1981 | Viers ....................... 285/268 X |
| 4,583,768 A | * 4/1986 | Aoki et al. ................... 285/267 |
| 4,871,181 A | * 10/1989 | Usher et al. ............. 285/268 X |
| 4,928,998 A | * 5/1990 | Brandener ............... 285/267 X |
| 5,779,282 A | * 7/1998 | Ezze .............................. 285/261 |
| 5,873,609 A | * 2/1999 | Abthoff et al. .......... 285/268 X |
| 6,279,965 B1 | * 8/2001 | Kida ........................ 285/47 X |

FOREIGN PATENT DOCUMENTS

| DE | 3503148 | * 8/1986 | ......... 285/FOR 118 |
| GB | 1502934 | * 3/1978 | ......... 285/FOR 118 |
| JP | 9-144534 | 6/1997 | ............. F01N/7/08 |
| JP | 9-317461 | 12/1997 | ............. F01N/7/08 |

* cited by examiner

Primary Examiner—Lynne H. Browne
Assistant Examiner—David E. Bochna
(74) Attorney, Agent, or Firm—Sughrue Mion, PLLC

(57) ABSTRACT

A connecting structure for exhaust pipes wherein a first connecting flange is connected to peripheries of downstream-end portions of a plurality of upstream exhaust pipes, a second connecting flange is connected to peripheries of upstream-end portions of a plurality of downstream exhaust pipes, and a plurality of spherical joints is provided between the two connecting flanges. Additionally, each of the spherical joints includes an annular seal unit adapted to be held in place between the fist and second connecting flanges, a spherical bearing surface formed on one of the connecting flanges, and a flat bearing surface on the other one of the connecting flanges. Each annular seal unit including a spherical portion on one side, and a flat portion on an opposite side. The spherical bearing surfaces on the one connecting flange are in slidable spherical contact with respective spherical portions formed on the annular seal units. Further, both the connecting flanges are made integral over the plurality of spherical joints. The flat bearing surfaces of the other connecting flange confront respective annular seal units so that the flat sides of the annular seal units are brought into contact with the flat bearing surfaces so that the annular seal units can slide thereover in a direction substantially normal to longitudinal axes of exhaust pipes.

8 Claims, 4 Drawing Sheets

CONNECTING STRUCTURE FOR EXHAUST PIPES

BACKGROUND OF THE INVENTION

1. Field of the Invention

The present invention relates to a connecting structure for exhaust pipes of an engine, and more particularly to a connecting structure between a plurality of parallel upstream exhaust pipes located downstream of an exhaust manifold and a plurality of parallel downstream exhaust pipes arranged so as to correspond to the upstream exhaust pipes, respectively.

2. Description of the Related Art

Conventionally, in exhaust pipes of an automotive engine, there has been known to the public an exhaust pipe connecting structure having a first connecting flange, and a second connecting flange. The first connecting flange is connected to peripheries of downstream-end portions of a plurality of parallel upstream exhaust pipes in such a manner as to extend over the downstream end portions of the upstream exhaust pipes. The second connecting flange is connected to peripheries of upstream-end portions of a plurality of parallel downstream exhaust pipes, arranged so as respectively to correspond to the upstream exhaust pipes, in such a manner as to extend over the upstream end portions of the downstream exhaust pipes. Further, a plurality of spherical joints is provided between the two connecting flanges for airtightly connecting the downstream-ends of the upstream exhaust pipes with respective upstream-ends of the downstream exhaust pipes. Each of the spherical joints includes an annular seal unit having a central opening for passage of exhaust gas, wherein each annular seal unit is held in place between the fist and second connecting eflangcs. Still further, spherical bearing surfaces are formed on one of the connecting flanges in such a manner as to be brought into slidable spherical contact with respective spherical portions formed on one side of each annular seal unit so as to surround the central opening. Additionally, elastic retaining means is provided between the two connecting flanges for elastically pressing the spherical bearingy surfaces against the spherical portions of the annular seal units (refer, for example, to FIG. 2 of JP-A-9-144534).

In this conventional structure, the upstream and downstream exhaust pipes can be bent relative to each other around an axis connecting, the spherical centers of the respective spherical joints, and the structure can be advantageous in permitting the swing of an engine in a specific direction with less effort, or advantageous in preventing the transmission of engine vibrations to a muffler or mufflers.

With the conventional structure, the first and second connecting flanges are formed integrally with the plurality of spherical joints in such a manner as to extend thereover. For example, the second connecting flange includes spherical bearing surfaces for holding the spherical joints. The conventional structure can be advantageous in reducing, the number of components to be used, but the annular seal units fit, respectively, on the peripheries of the end portions of the exhaust pipes extending from the first connecting flange— which has no spherical bearingy surfaces—without looseness. Therefore, because the exhaust pipes are mounted such that no slide of the annular seal units is permitted—in a direction normal to the axes of the exhaust pipes—elative to the bearing, surfaces of the connecting flanges, and/or because the pipes are mounted in a state in which the center axes thereof are fixed, the following problems result.

When, due to the production tolerance, a distance between the centers of respective mounting positions of the plurality of upstream exhaust pipes on the first connecting flange does not match a distance between the centers of respective mounting positions of the plurality of downstream exhaust pipes on the second connecting flange, the seal units are forced to bear unbalanced loads so as to be subjected to a large, lateral, unnatural, strain deformation. The large strain deformation results from the seal unit's location between the end portions of the exhaust pipes, on which the seal units are fitted, and the spherical bearing surface corresponding to the seal units. This large strain deformation leads to a risk of exhaust-gas leakage. Additionally, in order to avoid the above-described problem caused by the discord in distance between the centers of mounting positions, a high accuracy is required for production of both the upstream and downstream exhaust pipes. And the requirement for high accuracy leads to an increase in production cost.

With a view to solving the above problem, JP-A-9-317461 describes a connecting structure in which one of the connecting flanges-the one which has the spherical bearing surfaces—is formed with separate components for the respective spherical bearing surfaces, while the other connecting flange remains an integral component used commonly for the plurality of spherical joints. However, in order to reduce the number and weight of components involved, and in order to reduce production costs, it is desirable that each of the connecting flanges is formed as one piece which extends over the plurality of spherical joints.

SUMMARY OF THE INVENTION

The present invention was made in view of the above circumstances, and an object thereof is to provide a connecting structure for exhaust pipes in which each first and second connecting flanges is formed as an integral component extending over a plurality of spherical joints, and in which high production accuracy is not required.

With a view to attaining, the above and other objects, a first aspect of the invention provides a connecting structure for exhaust pipes including a first connecting flange, a second connecting flange, and a plurality of spherical joints. The first connecting flange is connected to peripheries of downstream-end portions of a plurality of parallel upstream exhaust pipes in such a manner as to extend over the downstream-end portions of the upstream exhaust pipes. The second connecting flange is connected to peripheries of upstream-end portions of a plurality of parallel downstream exhaust pipes—arranged so as to correspond to the upstream exhaust pipes, respectively—in such a manner as to extend over the upstream-end portions of the downstream exhaust pipes. And the plurality of spherical joints is disposed between the two connecting flanges for airtightly connecting downstream-ends of the upstream exhaust pipes with respective upstream-ends of the downstream exhaust pipes. Each of the spherical joints includes an annular seal unit having a central opening for passage of exhaust gas, the annular seal units being held in place between the fist and second connecting flanges.

Further, spherical bearing, surfaces arc formed on one of the connecting flanges so as to be brought into slidable spherical contact with spherical portions formed on respective annular seal units. The spherical bearing, surfaces also surround respective central opening,s in the annular seal units. Additionally, flat bearing surfaces are formed on the other connecting flange so as to confront the respective seal units, and so as to be in relatively slidable contact therewith in a direction substantially normal to longitudinal axes of the respective exhaust pipes.

According to the above feature, when the distance between centers of mounting, positions of the plurality of respective upstream exhaust pipes to the first connecting flange does not match the distance between centers of mounting position of the plurality of respective downstream pipes to the second connecting flange—due to production errors or the like—the plurality of annular seal units is held in place between the two connecting flanges so that the fiat sides of respective seal units are allowed to slide on the flat bearing surfaces of the other connecting flange without any strain. Therefore, it is possible to effectively prevent the seal units from being subjected to unbalanced transversal loads between the two connecting flanges and, thereby, strain deformed. Therefore, the connecting structure for exhaust pipes according to the present invention is less likely to have gas leakage, and no high manufacturing precision is required for production of the connecting flanges and exhaust pipes.

Additionally, each of the first and second connecting flanges can be formed integrally in such a manner as to extend over the plurality of spherical joints, whereby the number of components is reduced and, hence, the weight and costs of the connecting structure is also reduced.

Moreover, because of the sliding displacement of the respective annular seal units on the flat bearing surfaces of the other connecting flange, the upstream and downstream exhaust pipes are allowed to flex relative to one another. That is, the upstream and downstream exhaust pipes can flex relative to one another about the axis connecting the spherical centers of the spherical joints. The axis connecting the spherical centers of the spherical bearing surfaces can be displaced in various directions along the flat bearing surfaces relative to the other connecting flange, whereby even if the rocking axis or rolling axis of the engine is displaced, the upstream and downstream exhaust pipes are allowed to flex relative to one another. This flexure is important because the rocking or rolling axis of the entwine may be displaced in response to a change in operating condition, for example, when there is being generated a driving reaction force, a change in weight of the engine itself in conjunction with change in oil volume therein, or when the vehicle is being inclined. Because the upstream and downstream exhaust pipes are allowed to flex relative to each other in accordance with such a displacement, it is possible to effectively absorb the rocking and rolling displacement of the engine without strain.

According to a second aspect of the invention, there is provided a connecting structure for exhaust pipes as set forth in the first aspect of the invention, and further wherein:

for each spherical joint, an annular extended portion is integrally formed on one of the upstream exhaust pipes, the downstream exhaust pipes, the first connecting flange, and the second connecting flange, the annular extended portion being disposed in the central opening, and a diametrical gap is formed between an outer peripheral surface of the extended portion and an inner circumferential surface of the central opening, the is diametrical gap permitting the sliding movement of the annular seal unit.

According to this aspect of the present invention, the heat shielding effect of the extended portions prevents the exposure of the annular seal units to exhaust gas and, hence, suppresses the early deterioration thereof by heat. However, even with the annular extended portions being so provided, the seal units are allowed to slide for displacement without any difficulty because their flat sides engage the fiat bearing(g surfaces of the other connecting flange, and they are not disturbed by the extended portions.

According to a third aspect of the invention, there is provided a connecting structure for exhaust pipes as set forth in the first aspect of the invention, wherein each of the spherical joints further includes:

a cylindrical heat shielding member fitted in and secured to an inner circumferential surface of the central opening of the annular seal unit; and a space adjacent to an inner circumferential side of the heat shielding member, wherein the space permits the sliding, movement of the annular seal unit.

According to this aspect of the present invention, the extended portions do not always need to be provided on the connecting flanges or the exhaust pipes, thereby increasing the degree of freedom in designing the components.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein.

DETAILED DESCRIPTION OF THE PREFERRED EMBODIMENTS

A mode for carrying out the invention will be described below with reference to embodiments of the invention shown in the accompanying drawings.

Figure 1:
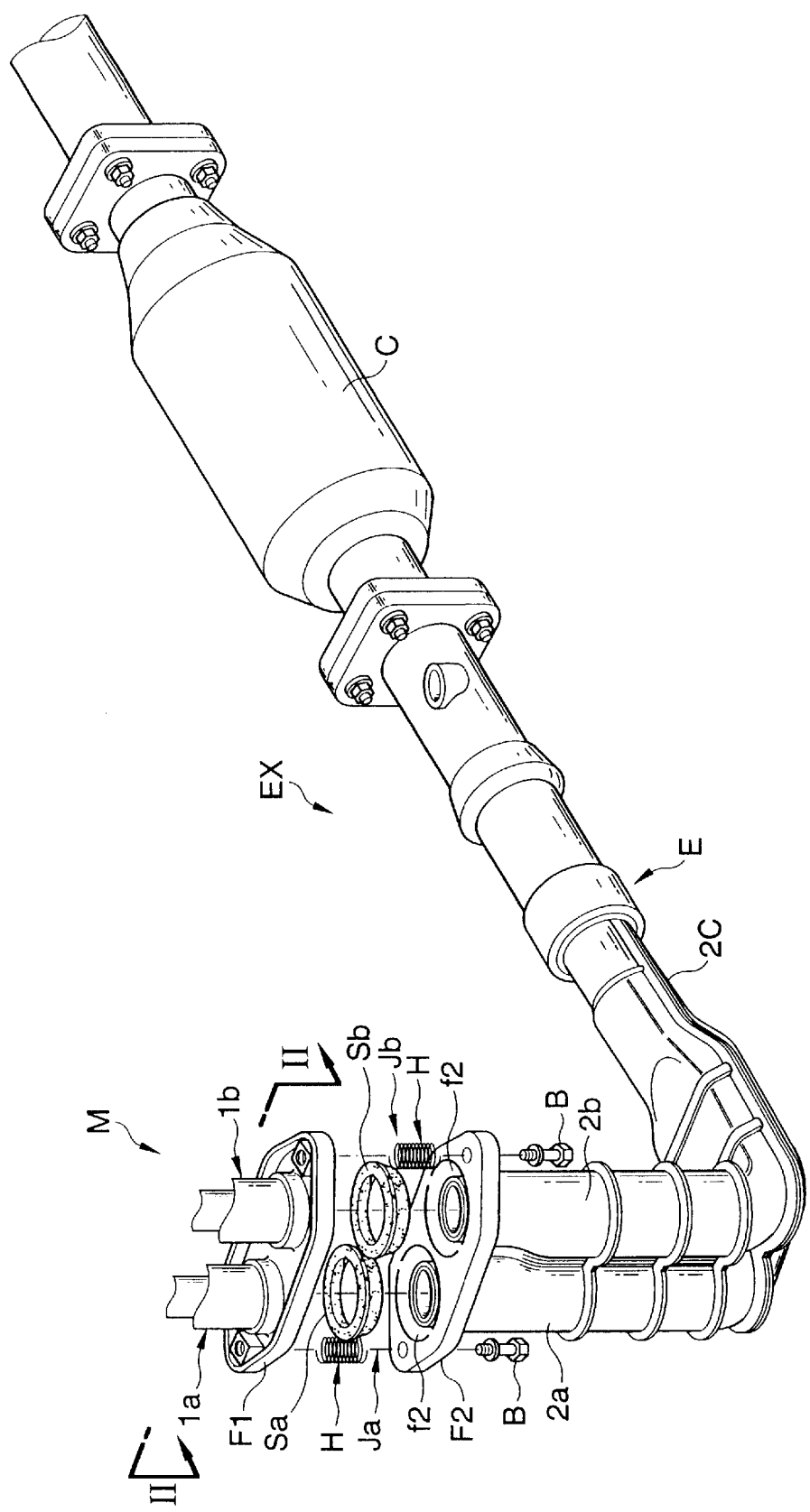
FIG. 1 is an exploded perspective view showing a main part of a first embodiment of an exhaust system, for an automotive engine, to which the invention is applied.
Figure 2:
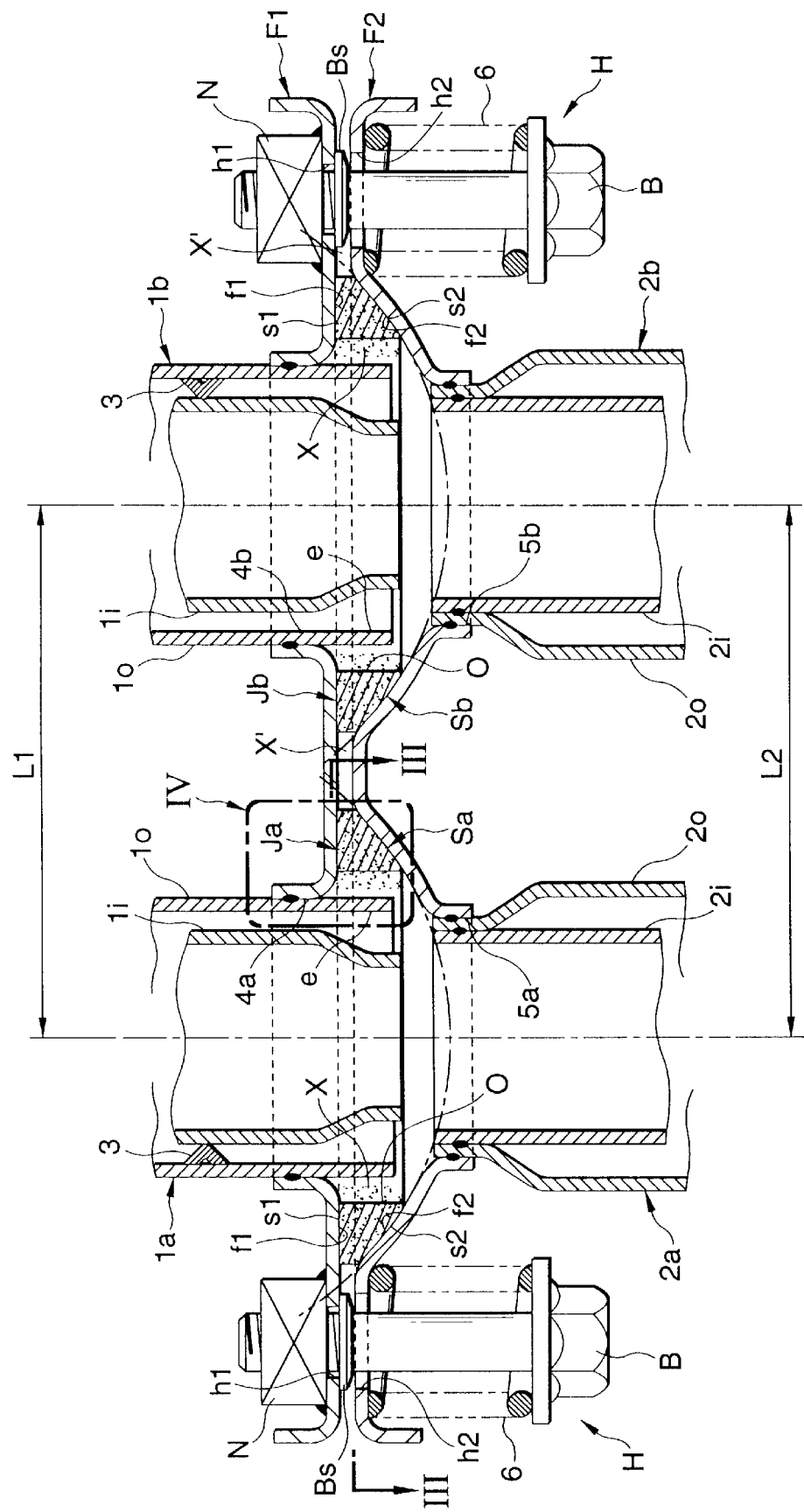
FIG. 2 is an enlarged sectional view taken along the line II—II in FIG. 1.
Figure 3:
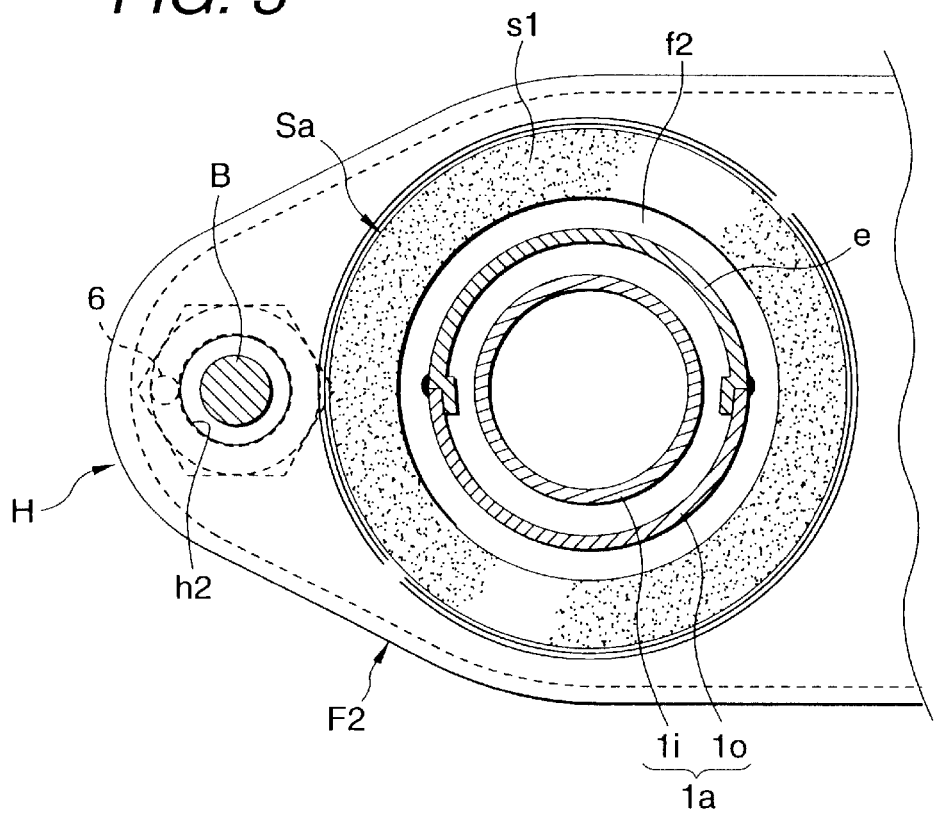
FIG. 3 is a sectional view taken along the line III—III in FIG. 2.
Figure 4:
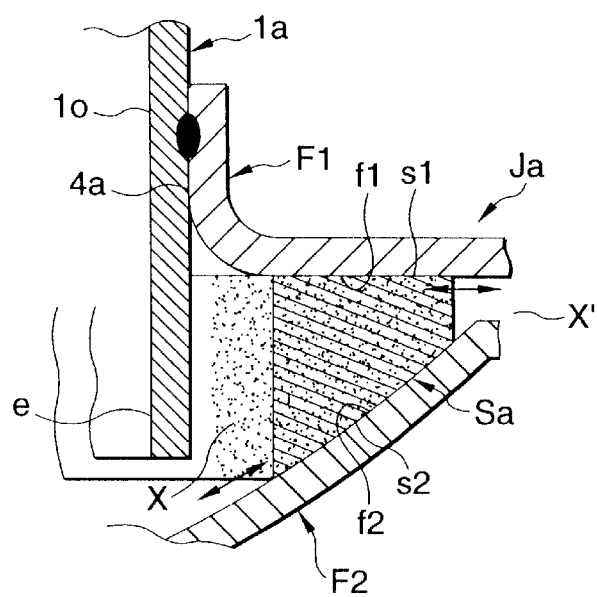
FIG. 4 is an enlarged view as viewed in a direction designated by an arrow IV in FIG. 2.

In the accompanying drawings, FIGS. 1 to 4 show a first embodiment of the present invention as embodied in an automotive-engine exhaust system. First, as shown in FIG. 1, an automotive-engine exhaust manifold system Ex comprises an exhaust manifold M, an exhaust pipe E adapted to be connected to downstream-end of the manifold M, and a catalytic converter C interposed in series along the length of the exhaust pipe E. Further, the exhaust manifold system includes an exhaust muffler (not shown) downstream of the catalytic converter C.

The exhaust manifold M includes a manifold main body (not shown) having a plurality of exhaust manifold headers connecting to a plurality of exhaust ports of the engine. Further, the exhaust manifold M includes a plurality (two in the illustrated example) of collective exhaust pipes $1a$, $1b$ adapted to connect to the manifold main body so as to merge the respective exhaust manifold headers at downstream ends thereof. The collective exhaust pipes $1a$, $1b$ are disposed in parallel with each other and constitute upstream exhaust pipes of the invention.

Additionally, the exhaust pipe E upstream of the catalytic converter C includes a plurality (two in the illustrated example) of first exhaust pipes $2a$, $2b$ which are disposed in parallel so as to correspond, respectively, to the collective exhaust pipes 1a, 1b. Further, this section of the exhaust pipe E includes a single second exhaust pipe 2c continuous with a downstream merged portion where the first exhaust pipes 2a, 2b are merged together. The first exhaust pipes 2a, 2b constitute downstream exhaust pipes of the invention. The first exhaust pipes 2a, 2b (which are the downstream exhaust pipes) and the collective exhaust pipes 1a, 1b (which are the upstream exhaust pipes) are detachably connected to each other by a pipe connecting mechanism according to the invention which is interposed between the upstream and downstream exhaust pipes.

Namely, a single common first connecting flange F1 is integrally connected—by a securing means, such as welding—to peripheries of the downstream-end portions of the collective exhaust pipes 1a, 1b in such a manner as to extend over the peripheries of the downstream-end portions. Similarly, a single common second connecting flange F2 is integrally connected—by a securing means, such as welding—to peripheries of upstream-end portions of the first exhaust pipes 2a, 2b in such a manner as to extend over the peripheries of the upstream-end portions. The upstream-end portions of the first exhaust pipes correspond, respectively, to the downstream-ends of the collective exhaust pipes 1a, 1b.

Additionally, in the illustrated example, the collective exhaust pipes 1a, 1b are each formed with a double pipe construction including an inner pipe 1i and an outer pipe 1o surrounding the inner pipe 1i with a certain annular gap being provided therebetween. A plurality of spacers 3 are secured circumferentially and axially to an inner circumference of the outer pipe 1o at suitable intervals in such a manner as to be brought into slidable engagement with the inner pipe 1i to maintain a constant gap between the outer pipe 1o and the inner pipe 1i. Then, mounting holes 4a, 4b are opened in parallel in the first connecting flange F1 so that the outer circumferences of the downstream-end portions of the outer pipes 1o fit therein. An airtight connection—using a securing means such as welding or the like—is provided between the mounting holes 4a, 4b and the outer pipes 1o, 1o.

On the other hand, each of the first exhaust pies 2a, 2b and the second exhaust pipe 2e are also formed with a double pipe construction in which each exhaust pipe is constituted by an inner pipe 2i and an outer pipe 2o surrounding the inner pipe 2i with a certain annular gap being provided therebetween. In the illustrated example, in particular, the first-exhaust-pipe outer pipes 2o are integrally connected to each other except at upstream-end portions thereof, and downstream-end portions of the first-exhaust-pipe outer pipes 2o are integrally connected to an outer pipe 2o of the second exhaust pipe 2c.

The adoption of the inner and outer double pipe construction, of the respective exhaust pipes 1a, 1b, 2a, 2b, 2c, serves to effectively suppress the increase in temperature inside the engine compartment, whereby the heat damage to the engine components and its accessory components can be limited. However, a heat shielding cover additionally may be provided on the exterior of the respective exhaust pipes as required.

The upstream ends of the respective outer pipes 2o—of the first exhaust pipes 2a, 2b—are radially inwardly narrowed so that they can be welded, respectively, to the outer circumferences of the upstream ends of the corresponding inner pipes 2i. Mounting holes 5a, 5b are disposed in the second connecting flange F2 and receive, therein, the outer circumferences of the upstream-end portions of the respective outer pipes 2o of the first exhaust pipes 2a, 2b. An airtight connection—using a securing means such as welding—is provided between the mounting holes 5a, 5b and the outer pipes 2o, 2o of the first exhaust pipes 2a, 2b, respectively.

A plurality (for example, a pair as in the illustrated example) of spherical joints Ja, Jb a are provided between the downstream ends of the collective exhaust pipes 1a, 1b and the upstream ends of the plurality of first exhaust pipes 2a, 2b. The upstream ends of the first exhaust pipes 2a, 2b correspond to the downstream ends of the collective exhaust pipes 1a, 1b for providing, an airtight connection between the first and second connecting flanges F1, F2.

The spherical joints Ja, Jb a include annular seal units Sa, Sb, annular and spherical bearing surfaces f2, and elastic holding means H. The annular seal units Sa, Sb are formed of a heat resistant material such as carbon. Also, the annular seal units Sa, Sb each have a central opening O for passage of exhaust gas, each have an annular spherical portion s2 formed on one side thereof so as to surround the central opening O, and are held between the respective first and second connecting flanges F1, F2. Additionally, the annular seal units Sa, Sb include sides s1 which are opposite to the sides on which the annular spherical portions s2 are formed, and which are flat. The annular and spherical bearing surfaces f2 are formed in the second connecting flange F2 so as to be brought into slidable spherical contact with the annular spherical portions s2 formed on the annular seal units Sa, Sb. The elastic holding means H is provided between the two connecting flanges F1, F2 so as to elastically push the bearing surfaces f2 against the spherical portions s2 of the annular seal units Sa, Sb.

The elastic holding means H includes pairs of through holes h1, h2, a pair of nuts N, a pair of bolts B, and a pair of springs 6. The pairs of through holes h1, h2 arc respectively formed in end portions of the first connecting flange F1 and the second connecting flange F2. The nuts N arc secured to one of the connecting flanges (which is the first connecting fange F1 in the illustrated example) in such a manner as to correspond to the through holes h1 so formed therein. The bolts B are loosely inserted through the through holes h1, h2 and are screwed, respectively, into the nuts N. The springs 6 are held in a compressed state between head portions of the bolts B and the other connecting flange (which is the second connecting flange F2 in the illustrated example). The spring-back forces of the springs 6 bias the two connecting flanges F1, F2 such that the flanges approach each other, whereby the annular seal units Sa, Sb are held between the bearing surfaces f1, f2 which confront each other. Additionally, stoppers Bs are integrally provided around respective outer circumferences of shank portions of the bolts B. Each stopper Bs is provided at an intermediate position along the length of the shank portion to limit the screwing insertion of a bolt B into a respective nut N through engagement with the nut-side connecting flange F1. External threads are formed in the shank portions of the bolts B distally of the stoppers Bs.

Further, flat annular bearing surfaces f1 are formed on surfaces of the first connecting flange F1, and arc disposed so as to confront the annular seal units Sa, Sb, respectively. The flat annular bearing surfaces f1 extend in a direction normal to axes of the respective exhaust pipes 1a, 1b to which the first connecting flange F1 is to be connected. Further, the flat annular bearing surfaces f1 are disposed so as to surround the exhaust pipes 1a, 1b, respectively, and so as to contact the sides si of the respective annular seal units Sa, Sb. The sides s1 are brought into contact with the flat bearing surfaces f1 such that the annular seal units are allowed to slide with respect to the flat bearing surfaces t1.

Moreover, downstream-end portions of both the inner and outer pipes 1*i*, 1*o*, to outer circumferences of which the first connecting flange F1 is connected, are made to extend downwardly of the flat bearing surfaces fi toward the second connecting flange F2. Also, a radial gap X is formed between the outer circumferential surfaces of extended portions e of the outer pipes 1*o* and the inner circumferential surfaces of the annular seal units Sa, Sb so as to permit relative sliding between the annular seal units Sa, Sb and the bearing surfaces f1 of the first connecting flange F1. In addition, a gap X' is also formed around the outer circumferences of the annular seal units Sa, Sb so as to permit the relative sliding.

Next, the operation of the first embodiment will be described. In an assembling process of the exhaust system EX, the spherical portions s2 of the annular seal units are seated on the respective spherical bearing surfaces f2 of the second connecting flange,e F2. The collective exhaust pipes 1*a*, 1*b* (which are the upstream exhaust pipes) are then connected with the first exhaust pipes 2*a*, 2*b* (which are the downstream exhaust pipes) so that the annular seal units Sa, Sb are held between the first and second flanges F1, F2 (previously which were connected to the respective exhaust pipes). Then, the bolts B of the elastic holding means are screwed into respective nuts N so that the springs 6 are held compressed between the head portions of the bolts B and the second connecting flange F2. Thus, the spring-back forces of the springs 6 bias the two connecting flanges F1, F2 such that the flanges approach each other, whereby the spherical bearing surfaces f2 of the second connecting flange F2 and the flat bearing surfaces f1 of the first connecting flange F1 are respectively elastically pressed against the spherical portions s2 and the flat surfaces s1 of the annular seal units Sa, Sb. Thus, the collective exhaust pipes 1*a*, 1*b* and the first exhaust pipes 2*a*, 2*b* (i.e., the exhaust pipe E) are connected to each other via the spherical joints Ja, Ja.

There may occur, due to production errors of the respective constituent components, a case where a distance L1 between centers of mounting positions or the collective exhaust pipes 1*a*, 1*b* to the first connecting flange F1 becomes inconsistent with a distance L2 between centers of mounting positions of the first exhaust pipes 2*a*, 2*b* to the second connecting flange F2. When this takes place, in the illustrated example, the annular seal units Sa, Sb—held between the two connecting flanges F1, F2, i.e., between the confronting bearing surfaces f1, f2—are permitted to slide. That is, the sides s1 are permitted to slide along the flat bearing surfaces f1 of the first connecting flange F1 without strain. Such an arrangement prevents the occurrence of a problem wherein the seal units Sa, Sb are subjected to a large magnitude of unbalanced transversal load so as to be strain deformed, which would result in gas leakage. Moreover, in the present invention, high production accuracy is not required for the production of the respective constituent components involved—such as the two connecting flanges F1, F2, and the exhaust pipes 1*a*, 1*b*, 2*a*, 2*b*—yet the above-described problem is prevented. In addition, since either of the connecting flanges F1, F2 can be formed of one piece so as to extend over the plurality of spherical joints Ja, Jb, it is possible to reduce the number of components involved in the exhaust pipe connecting structure, to reduce the weight of the connecting structure, and to reduce the production costs thereof.

Additionally, because of the sliding displacement of the respective annular seal units Sa, Sb on the flat bearing surfaces f1 of the first connecting flange F1, the upstream 1*a*, 1*b* and downstream 2*a*, 2*b* exhaust pipes are allowed to flex relative to one another. That is, the upstream and downstream exhaust pipes 1*a*, 1*b*; 2*a*, 2*b* can flex relative to each other about the axis connecting the spherical centers of the spherical bearing surfaces 12 of the respective spherical joints Ja, Jb. The axis connecting the spherical centers can be displaced in various directions along the bearing surfaces f1 relative to the first connecting flange F1, whereby even if the rocking axis or rolling axis of the engine is displaced, the upstream 1*a*, 1*b* and downstream 2*a*, 2*b* exhaust pipes arc allowed to flex relative to one another. This flexure is important because the rocking or rolling axis of the engine may be displaced in response to a change in operating condition, for example, when a driving reaction force is generated, when there is a change in weight of the engine itself in conjunction with change in oil volume therein, or wherein the vehicle is being inclined. Because the upstream and downstream exhaust pipes 1*a*, 1*b*, 2*a*, 2*b* are allowed to flex relative to each other in accordance with such a displacement, it is possible to effectively absorb the rocking and displacement of the engine without strain.

In addition, in this first embodiment, the end portions of the outer pipes 1*o* extend downwardly of the flat bearing surfaces f1 of the first connecting flange F1 and toward the second connecting flange F2. The extended portions e are constructed so as to act as heat shielding plates for the respective seal units Sa, Sb. Heat deterioration of the seal units Sa, Sb is caused by direct exposure of the seal units Sa, Sb to the exhaust gas. However, according to the heat shielding effect of the extended portions e of the present invention, heat deterioration of the respective seal units Sa, Sb is effectively suppressed, whereby the durability of the seal units Sa, Sb is improved. Additionally, a radial gap X—formed between the outer circumferential surfaces of the extended portions e and the inner circumferential surfaces of the respective seal units Sa, Sb—surrounds the extended portions e so as to permit relative is sliding between the seal units Sa, Sb and the bearing surfaces f1. Due to the radial gap X, this relative sliding is not interrupted by the extended portions e, so that the sides s1 slide on the bearing surfaces f1 of the first connecting flange F1 without strain.

Figure 5:
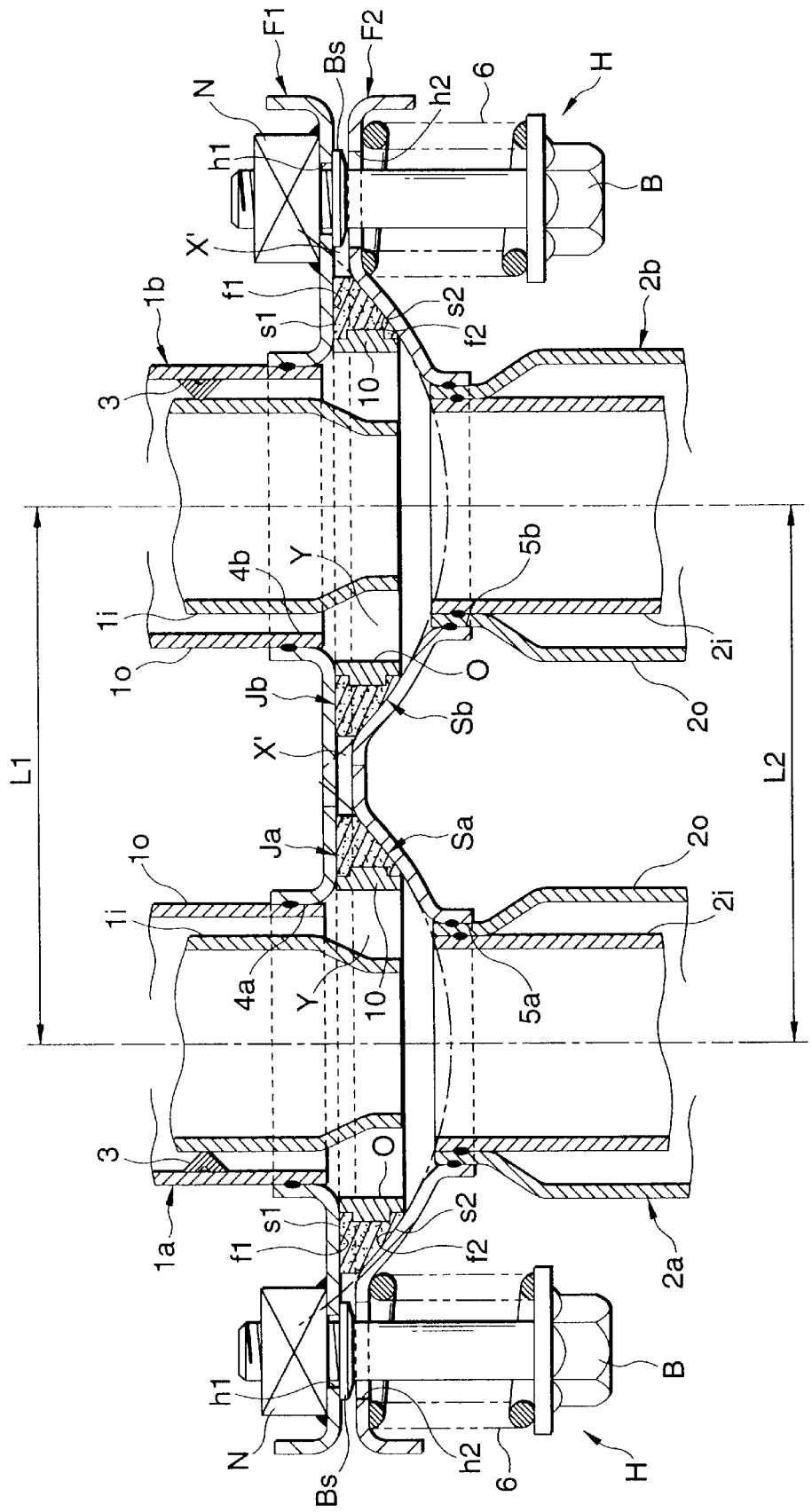
FIG. 5 is an enlarged sectional view, similar to FIG. 2, but showing a second embodiment of the present invention.

FIG. 5 shows a second embodiment of the present invention. In this embodiment, in contrast to the first embodiment, end portions of the outer pipes 1*o*—of collective exhaust pipes 1*a*, 1*b*—are not extended. That is, there is no extended portion e in the second embodiment. Instead, cylindrical heat shielding members 10—formed of a heat resistant metallic material such as stainless steel—are fitted in and secured to inner circumferential surfaces of respective annular seal units Sa, Sb in such a manner as to extend over the entirety thereof. Moreover, spaces Y are formed adjacent to the inner circumferential surfaces of the respective heat shielding members 10. The spaces Y permit relative siding between the respective seal units Sa, Sb and the bearing surfaces f1 of the first connecting flange F1. The remaining construction of the second embodiment is similar to that described in the first embodiment and, therefore, like reference numerals are given to like parts as described in the first embodiment and, hence, the description thereof is omitted.

Thus, the second embodiment provides basically similar operation and effectiveness as that of the first embodiment. Further, because heat shielding extended portions e do not necessarily have to be provided, the degree of freedom in deigning the constituent components is improved.

While embodiments of the invention have been described above, the invention is not limited to these embodiments but may be modified in various ways to provide further various embodiments within the scope of the invention.

For example, in the above-described embodiments, the collective exhaust is pipes 1a, 1b of the exhaust manifold M and the exhaust pipe E—including first exhaust pipes 2a, 2b—downstream of the exhaust manifold M are illustrated as the upstream exhaust pipes and the downstream exhaust pipes, respectively. But the application of the connecting structure according to the invention is not so limited.

The connecting structures according to the present invention may be applied, for example, to a connecting portion of pluralities of upstream and downstream exhaust pipes located anywhere downstream of an exhaust manifold.

Additionally, in the first embodiment the heat shielding extended portions e are formed at the downstream end portions of the collective exhaust pipes 1a, 1b which act as the upstream exhaust pipes, but the heat shielding extended portions e may be formed at the upstream end portions of the first exhaust pipes 2a, 2b which act as the downstream exhaust pipes. Alternatively, the heat shielding extended portions e may be formed on either of the connecting flanges F1, F2.

As has been described above, according to the first aspect of the invention, even when production errors cause a case in which the distance between the centers of the mounting positions of the plurality of upstream exhaust pipes becomes inconsistent with the distance between the centers of the mounting positions of the plurality of downstream exhaust pipes, the plurality of annular seal units are held between the two connecting flanges so that the respective seal units are permitted to slide on the connecting flange without strain. Thus, strain deformation of the seal units, which to would cause a gas leakage, is effectively prevented. Moreover, according to the present invention, high production accuracy is not required for producing the connecting flanges and the exhaust pipes which prevent strain deformation, therefore the control of production accuracy is facilitated and the production costs are reduced. In addition, since either of the connecting flanges can be formed integrally so as to is extend over the plurality of spherical joints, it is possible to reduce the number of components involved in the exhaust pipe connecting structure, to reduce the weight of the connecting structure, and to reduce the production costs thereof.

Additionally, because the sliding displacement of the respective annular seal units on the flat bearing surfaces of the connecting flange, the upstream and downstream exhaust pipes can flex relative to each other about the axis connecting the spherical centers of the spherical bearing surfaces of the respective spherical joints. Thus, one connecting flange can be displaced in various directions relative to the other connecting flange, whereby even it the rocking axis or rolling axis of the engine is displaced in response to a change in operating condition, the upstream and downstream exhaust pipes are allowed to flex relative to each other in accordance with such a displacement, thereby making it possible to effectively absorb—without strain—the rocking and rolling displacement of the engine.

According, to the second aspect of the invention, premature heat deterioration of the annular seat units—attributable to the direct exposure thereof to the exhaust gas—can be suppressed by virtue of the heat shielding effect of the extended portions provided on the connecting flange or the exhaust pipes, whereby durability thereof is improved. Moreover, even if extended portions are so provided, the seal units are permitted to slide on the flat bearing surface without difficulty.

Further, according to the third aspect of the invention, cylindrical heat shielding members are provided on the inner circumferential surfaces of the respective annular seal units and, therefore, heat shielding extended portions do not necessarily have to be provided on the connecting flanges or the exhaust pipes, whereby the degree of freedom in designing the components is increased.

It is contemplated that numerous modifications may be made to the connecting structure, for exhaust pipes, of the present invention without departing from the spirit and scope of the invention as defined in the following claims.

What is claimed is:

1. A connecting structure for exhaust pipes, comprising:

a plurality of upstream exhaust pipes including downstream-end portions having peripheries;

a first connecting flange connected to the peripheries of the downstream-end portions of said upstream exhaust pipes;

a plurality of downstream exhaust pipes arranged so as respectively to correspond to said upstream exhaust pipes, said plurality of downstream exhaust pipes including upstream-end portion having peripheries;

a second connecting flange connected to the peripheries of the upstream-end portions of said downstream exhaust pipes; and a plurality of spherical joints located between said first connecting flange and said second connecting flange for airtightly connecting said downstream end portions of said upstream exhaust pipes with said upstream end portions of said corresponding downstream exhaust pipes, respectively, each of said spherical joints comprising:

an annular seal unit with a central opening for passage of exhaust gas, a spherical portion on one side of said annular seal unit, and a flat surface on the other side of said annular seal unit, said annular seal unit being held between said fist and second connecting flanges;

a spherical bearing surface formed on one of said first and second connecting flanges in such a manner as to be brought into slidable spherical contact with the spherical portion formed on one side of said annular seal units, wherein said spherical bearing surface surrounds said central opening; and a flat bearing surface formed on the other one of said first and second connecting flanges, wherein said flat bearing surface is disposed so as to confront said annular seal unit such that said flat bearing surface contacts and is slidable with respect to the flat surface of said annular seal unit in a direction oblique to longitudinal axes of the exhaust pipes connected to said other one of said first and second connecting flanges.

2. A connecting structure for exhaust pipes as set forth in claim 1, wherein for each spherical joint, an annular extended portion is integrally formed on one of said upstream exhaust pipes, said downstream exhaust pipes, said first connecting flange, and said second connecting flange, said annular extended portion being disposed in said central opening, and wherein a diametrical gap is formed between an outer peripheral surface of said extended portion and an inner circumferential surface of said central opening, said diametrical gap permitting the sliding movement of said annular seal unit.

3. A connecting structure for exhaust pipes as set forth in claim 1, wherein each of said spherical joints further includes:
- a cylindrical heat shielding member fitted in and secured to an inner circumferential surface of said central opening of said annular seal unit, and
- a space adjacent to an inner circumferential side of said heat shielding member, wherein said space permits the sliding movement of the annular seal unit.

4. A connecting structure for exhaust pipes as set forth in claim 1, wherein said first connecting flange extends around each one of said plurality of parallel upstream exhaust pipes, and is formed of a single unit.

5. A connecting structure for exhaust pipes as set forth in claim 1, wherein said second connecting flange extends around each one of said plurality of parallel downstream exhaust pipes, and is formed of a single unit.

6. A connecting structure for exhaust pipes as set forth in claim 1, wherein said plurality of upstream exhaust pipes are parallel to one another.

7. A connecting structure for exhaust pipes as set forth in claim 1, wherein said plurality of downstream exhaust pipes are parallel to one another.

8. A connecting structure for exhaust pipes as set forth in claim 1, wherein said flat bearing surface is disposed so as to confront said annular seal unit such that said flat bearing surface contacts and is slidable with respect to the flat surface of said annular seal unit in a direction substantially perpendicular to the longitudinal axes of the exhaust pipes connected to said other one of said first and second connecting flanges.

* * * * *